(12) United States Patent
Kawaguchi et al.

(10) Patent No.: US 8,536,271 B2
(45) Date of Patent: *Sep. 17, 2013

(54) THERMOPLASTIC ELASTOMER COMPOSITION

(75) Inventors: Koichi Kawaguchi, Hiratsuka (JP); Naoyuki Morooka, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 306 days.

This patent is subject to a terminal disclaimer.

(21) Appl. No.: 12/848,519

(22) Filed: Aug. 2, 2010

(65) Prior Publication Data

US 2011/0028648 A1 Feb. 3, 2011

(30) Foreign Application Priority Data

Aug. 3, 2009 (JP) ................................. 2009-180918

(51) Int. Cl.
  *C08G 63/48* (2006.01)
  *C08L 29/04* (2006.01)

(52) U.S. Cl.
  USPC ............... 525/57; 152/203; 152/510; 525/58; 525/327.5; 525/351

(58) Field of Classification Search
  USPC ................. 152/510, 203; 525/57, 58, 327.5, 525/351
  See application file for complete search history.

(56) References Cited

U.S. PATENT DOCUMENTS

| 4,094,831 A | * | 6/1978 | Sandstrom | .................... 525/194 |
| 6,841,618 B2 | * | 1/2005 | Masuda | .......................... 525/57 |
| 2006/0142485 A1 | | 6/2006 | Hoch et al. | |
| 2009/0038729 A1 | * | 2/2009 | Soeda et al. | .................. 152/510 |

FOREIGN PATENT DOCUMENTS

| EP | 1338621 A1 | | 8/2003 |
| JP | 2002-060500 A | | 2/2002 |
| JP | 2002060500 A | * | 2/2002 |
| JP | 2006-161045 A | | 6/2006 |
| JP | 2007-211059 A | | 8/2007 |
| JP | 2007211059 A | * | 8/2007 |

OTHER PUBLICATIONS

Extended European Search Report issued in related European Application No. 10171726.2 on Nov. 29, 2010.

* cited by examiner

*Primary Examiner* — David W Wu
*Assistant Examiner* — Marie Reddick
(74) *Attorney, Agent, or Firm* — Novak Druce Connolly Bove + Quigg LLP

(57) ABSTRACT

An object of the present invention is, in a thermoplastic elastomer composition in which a modified rubber is dispersed and filled in an ethylene-vinyl alcohol copolymer matrix in order to improve the low-temperature durability of the ethylene-vinyl alcohol copolymer, to reduce the extrusion load during extrusion molding thereof into a film without deteriorating the low-temperature durability. The present invention is a thermoplastic elastomer composition comprising an ethylene-vinyl alcohol copolymer (A) and a modified rubber (B) dispersed in the ethylene-vinyl alcohol copolymer (A), wherein the modified rubber (B) has an acid anhydride group or epoxy group and is dynamically cross-linked by a compound (C) having at least two amino groups. This thermoplastic elastomer composition can be suitably used in the production of an inner liner of a pneumatic tire.

10 Claims, No Drawings

THERMOPLASTIC ELASTOMER COMPOSITION

CROSS REFERENCE TO RELATED APPLICATIONS

This application claims priority under 35 U.S.C. §119(a) on Patent Application No(s). 2009180918 filed in Japan on Aug. 3, 2009, the entire contents of which are hereby incorporated by reference.

TECHNICAL FIELD

The present invention relates to a thermoplastic elastomer composition comprising an ethylene-vinyl alcohol copolymer and modified rubber. Particularly, the present invention relates to a thermoplastic elastomer composition in which modified rubber is dispersed in the ethylene-vinyl alcohol copolymer matrix, having a small extrusion load during extrusion molding thereof into a film.

BACKGROUND ART

Although an ethylene-vinyl alcohol copolymer can block gas, an organic liquid, etc., its impact resistance at a low temperature is not necessary sufficient. In this respect, in order to improve the impact resistance at a low temperature, it is known to admix a cross-linkable rubber modified with a reactive group into ethylene-vinyl alcohol copolymer. See Japanese Unexamined Patent Publication No. 2006-161045.

Further, it is known that, by dynamically cross-linking an ethylene-vinyl alcohol-based copolymer, elastomer, and organic peroxide or phenol resin-based cross-linking agent, the cross-linked elastomer can be uniformly dispersed in the ethylene-vinyl alcohol-based copolymer, and a thermoplastic elastomer composition having both a gas barrier property and flexibility can be obtained. See Japanese Unexamined Patent Publication No. 2007-211059.

SUMMARY OF INVENTION

Technical Problem

An object of the present invention is, in a thermoplastic elastomer composition in which a modified rubber having excellent low-temperature durability is dispersed and filled in an ethylene-vinyl alcohol copolymer matrix in order to improve the low-temperature durability of the ethylene-vinyl alcohol copolymer, to reduce the extrusion load during extrusion molding thereof into a film without deteriorating the low-temperature durability.

Solution to Problem

The present invention is a thermoplastic elastomer composition comprising an ethylene-vinyl alcohol copolymer (A) and a modified rubber (B) dispersed in the ethylene-vinyl alcohol copolymer (A), wherein the modified rubber (B) has an acid anhydride group or epoxy group and is dynamically cross-linked by a compound (C) having at least two amino groups.

It is preferable that the compound (C) having at least two amino groups also has a disulfide bond.

In addition, it is preferable that the modified rubber (B) is dynamically cross-linked by a compound (C1) having at least two amino groups and at least one disulfide bond and a compound (C2) having at least two amino groups and having no disulfide bond.

Further, a rubber constituting the modified rubber (B) is preferably an ethylene-α-olefin copolymer, or an ethylene-unsaturated carboxylic acid copolymer or a derivative thereof.

Further, the thermoplastic elastomer composition preferably comprises 90 to 180 parts by weight of the modified rubber (B) based on 100 parts by weight of the ethylene-vinyl alcohol copolymer (A).

Further, the thermoplastic elastomer composition preferably comprises 0.01 to 5 parts by weight of the compound (C) having at least two amino groups based on 100 parts by weight of the modified rubber (B).

The present invention is also a pneumatic tire comprising a film composed of the aforementioned thermoplastic elastomer composition as an inner liner.

Advantageous Effects of Invention

According to the present invention, in a thermoplastic elastomer composition in which a modified rubber is dispersed in ethylene-vinyl alcohol copolymer, by dynamically cross-linking the modified rubber with a compound having at least two amino groups, the extrusion load during extrusion molding of the thermoplastic elastomer composition into a film can be reduced without deteriorating the low-temperature durability.

DESCRIPTION OF EMBODIMENTS

The thermoplastic elastomer composition according to the present invention comprises an ethylene-vinyl alcohol copolymer (A) and a modified rubber (B) having an acid anhydride group or epoxy group.

The ethylene-vinyl alcohol copolymer (A) used in the present invention is a copolymer comprising ethylene unit ($-CH_2CH_2-$) and vinyl alcohol unit ($-CH_2-CH(OH)-$); however, it may also contain another constituent unit in addition to the ethylene unit and vinyl alcohol unit to such an extent that the effects of the present invention are not inhibited. The ethylene-vinyl alcohol copolymer used in the present invention comprises preferably 20 to 50 mol % of ethylene unit, and more preferably 20 to 40 mol % of ethylene unit. When the ethylene unit content in the ethylene-vinyl alcohol copolymer is less than 20 mol %, the ethylene-vinyl alcohol copolymer becomes likely to thermally decompose, while the gas-barrier properties of the ethylene-vinyl alcohol copolymer are deteriorated when the ethylene unit content is more than 50 mol %. The ethylene-vinyl alcohol copolymer is a saponification product of ethylene-vinyl acetate copolymer, and the saponification degree thereof is preferably not less than 90%, and more preferably not less than 99%. When the saponification degree of the ethylene-vinyl alcohol copolymer is too small, the gas-barrier properties of the ethylene-vinyl alcohol copolymer are deteriorated. An ethylene-vinyl alcohol copolymer is commercially available and can be obtained for example under the trade name of SOANOL® such as SOANOL® A4415 from Nippon Synthetic Chemical Industry Co., Ltd. and under the trade name of EVAL® from Kuraray Co., Ltd. Examples of the ethylene-vinyl alcohol copolymer whose ethylene unit content is 20 to 50 mol % include SOANOL® V2504RB (ethylene unit content: 25 mol %) manufactured by Nippon Synthetic Chemical Industry Co., Ltd. and EVAL® G156B manufactured by Kuraray Co., Ltd.

The modified rubber (B) used in the present invention has an acid anhydride group or epoxy group. From the standpoint of compatibility with the ethylene-vinyl alcohol copolymer, it is preferable that the modified rubber (B) has an acid anhydride group.

Examples of rubber constituting the modified rubber (B) include an ethylene-α-olefin copolymer, and ethylene-unsaturated carboxylic acid copolymer and derivatives thereof. Examples of the ethylene-α-olefin copolymer include an ethylene-propylene copolymer, ethylene-butene copolymer, ethylene-hexene copolymer and ethylene-octene copolymer. Examples of the ethylene-unsaturated carboxylic acid copolymer and derivatives thereof include an ethylene-acrylic acid copolymer, ethylene-methacrylic acid copolymer, ethylene-methyl acrylate copolymer, and ethylene-methyl methacrylate copolymer.

The modified rubber having an acid anhydride group can be produced, for example, by allowing an acid anhydride and peroxide to react with a rubber. Further, such modified rubber having an acid anhydride group is commercially available, and a commercially available product can be used. Examples of the commercially available product include maleic anhydride-modified ethylene-propylene copolymer TAFMER® MP0620 and maleic anhydride-modified ethylene-butene copolymer TAFMER® MP7020, which are manufactured by Mitsui Chemicals, Inc.

The modified rubber having an epoxy group can be produced by, for example, by copolymerizing glycidyl methacrylate with a rubber. Further, such modified rubber having an epoxy group is commercially available, and a commercially available product can be used. Examples of the commercially available product include epoxy modified ethylene-methyl acrylate copolymer ESPLENE® EMA2752 manufactured by Sumitomo Chemical Co., Ltd.

A particularly preferable modified rubber (B) is an ethylene-α-olefin copolymer graft-modified with an acid anhydride group, and examples thereof include the aforementioned maleic anhydride-modified ethylene-propylene copolymer TAFMER® MP0620 manufactured by Mitsui Chemicals, Inc.

As to the ratio of the ethylene-vinyl alcohol copolymer (A) and the modified rubber (B) in the thermoplastic elastomer composition, the thermoplastic elastomer composition comprises preferably 90 to 180 parts by weight, and more preferably 95 to 160 parts by weight of the modified rubber (B), based on 100 parts by weight of the ethylene-vinyl alcohol copolymer (A). When the ratio of the modified rubber (B) is too small, the low-temperature durability of the thermoplastic elastomer composition is inferior, while when the ratio is too large, the extrusion load during extrusion molding of the thermoplastic elastomer composition into a film is increased. In the thermoplastic elastomer composition of the present invention, the ethylene-vinyl alcohol copolymer (A) forms a continuous phase and the modified rubber (B) forms a dispersed phase.

In the thermoplastic elastomer composition of the present invention, the modified rubber (B) is dynamically cross-linked by a compound (C) having at least two amino groups. By this dynamic cross-linking, the dispersed condition of the modified rubber (B) in the thermoplastic elastomer composition can be fixed. The dynamic cross-linking of the modified rubber (B) by the compound (C) having at least two amino groups enables a reduction in the extrusion load during extrusion molding of the thermoplastic elastomer composition into a film without deteriorating the low-temperature durability thereof.

Examples of the compound (C) having at least two amino groups include diaminodiphenyl disulfide, diaminodiphenyl sulfone, hexamethylenediamine, triethylenetetramine, tetraethylenepentamine, methylenediamine carbamate and N,N'-dicinnamylidene-1,6-hexanediamine. Among these, one having a disulfide bond along with an amino group, for example, diaminodiphenyl disulfide, is preferable since it enables attainment of both low-temperature durability and processability.

Examples of the compound (C1) having at least two amino groups and at least one disulfide bond include diaminodiphenyl disulfide, diaminodibenzyl sulfide, dithiobis(methylaniline) and dinitrodiaminodiphenyl disulfide. A preferable compound (C1) is diaminodiphenyl disulfide. Examples of diaminodiphenyl disulfide include 2,2'-diaminodiphenyl disulfide, 2,3'-diaminodiphenyl disulfide, 2,4'-diaminodiphenyl disulfide, 3,3'-diaminodiphenyl disulfide, 3,4'-diaminodiphenyl disulfide and 4,4'-diaminodiphenyl disulfide. A preferable diaminodiphenyl disulfide is 2,2'-diaminodiphenyl disulfide. 2,2'-Diaminodiphenyl disulfide is a compound represented by the following chemical structural formula:

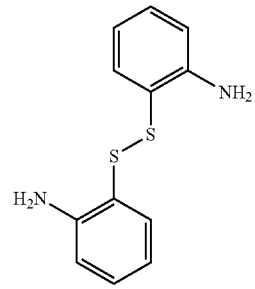 [SMILES: Nc1ccccc1SSc1ccccc1N]

It is more preferable to dynamically cross-link the modified rubber (B) by the compound (C1) having at least two amino groups and at least one disulfide bond, as well as by the compound (C2) having at least two amino groups and having no disulfide bond, since the low-temperature durability can be improved while reducing the extrusion load during extrusion molding of the thermoplastic elastomer composition into a film.

Examples of the compound (C2) having at least two amino groups and having no disulfide bond include a diaminodiphenyl sulfone, xylenediamine, trimethylhexamethylenediamine, methylpentamethylenediamine, diethylaminopropylamine, isophoronediamine, bis(aminomethyl)cyclohexane, norbornenediamine, diaminocyclohexane, diaminodiphenylmethane, meta-phenylenediamine, diaminodiphenyl sulfone and polyoxypropylenediamine. A preferable compound (C2) is diaminodiphenyl sulfone. Examples of diaminodiphenyl sulfone include 2,2'-diaminodiphenyl sulfone, 2,3'-diaminodiphenyl sulfone, 2,4'-diaminodiphenyl sulfone, 3,3'-diaminodiphenyl sulfone, 3,4'-diaminodiphenyl sulfone and 4,4'-diaminodiphenyl sulfone. A preferable diaminodiphenyl sulfone is 3,3'-diaminodiphenyl sulfone. 3,3'-Diaminodiphenyl sulfone is a compound represented by the following chemical structural formula:

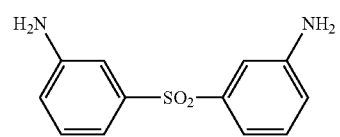

The amount of the compound (C) having at least two amino groups is preferably 0.01 to 5 parts by weight, more preferably 0.1 to 3 parts by weight, and still more preferably 0.5 to 2.4 parts by weight, based on 100 parts by weight of the modified rubber (B). When the amount of compound (D) is too small, the dynamic cross-linking is not sufficient and fine dispersion of the modified rubber (B) cannot be maintained, so that the extrusion load during extrusion molding of the thermoplastic elastomer composition into a film is increased. On the other hand, when the amount is too large, the low-temperature durability is reduced.

In cases where the compound (C1) having at least two amino groups and at least one disulfide bond and the compound (C2) having at least two amino groups and having no disulfide bond are used in combination, the total amount of the compound (C1) and the compound (C2) is preferably 0.01 to 5 parts by weight, more preferably 0.1 to 3 parts by weight, and still more preferably 0.6 to 2.4 parts by weight, based on 100 parts by weight of the modified rubber (B).

In cases where the compound (C1) having at least two amino groups and at least one disulfide bond and the compound (C2) having at least two amino groups and having no disulfide bond are used in combination, the ratio of the compound (C2) is preferably 20 to 80% by weight, and more preferably 50 to 60% by weight, based on the total amount of the compound (C1) and the compound (C2). With the ratio of the compound (C2) in this range, the low-temperature durability can be improved while reducing the extrusion load during extrusion molding of the thermoplastic elastomer composition into a film.

The dynamic cross-linking can be carried out by melt-blending the modified rubber (B) with the compound (C). The temperature of the melt-blending is usually not lower than the melting point of the ethylene-vinyl alcohol copolymer, and it is preferably 20° C. higher than the melting point of the ethylene-vinyl alcohol copolymer, for example, 220 to 240° C. The duration of the melt-blending is usually 1 to 10 minutes, and preferably 2 to 5 minutes.

The thermoplastic elastomer composition of the present invention can contain a thermoplastic resin (such as a polyamide resin) other than the ethylene-vinyl alcohol copolymer to such an extent that the effects of the present invention are not inhibited.

The thermoplastic elastomer composition of the present invention can be produced by melt-blending the ethylene-vinyl alcohol copolymer (A), the modified rubber (B) and the compound (C) having at least two amino groups.

The timing of adding the compound (C) having at least two amino groups may be at the same time as the melt-blending of the ethylene-vinyl alcohol copolymer (A) and the modified rubber (B), or after the melt-blending of the ethylene-vinyl alcohol copolymer (A) and the modified rubber (B). That is, the ethylene-vinyl alcohol copolymer (A), the modified rubber (B) and the compound (C) can be simultaneously melt-blended, or the ethylene-vinyl alcohol copolymer (A) and the modified rubber (B) are melt-blended and once the modified rubber (B) is sufficiently dispersed, the compound (C) can be added, followed by further melt-blending. Preferably, the ethylene-vinyl alcohol copolymer (A) and the modified rubber (B) are melt-blended and once the modified rubber (B) is sufficiently dispersed, the compound (C) is added, followed by further melt-blending.

The temperature of the melt-blending is not lower than the melting point of the ethylene-vinyl alcohol copolymer, and it is preferably 20° C. higher than the melting point of the ethylene-vinyl alcohol copolymer, for example, 230 to 250° C. The duration of the melt-blending is usually 1 to 10 minutes, and preferably 2 to 5 minutes. In addition, the shear rate during kneading is preferably 1,000 to 8,000 $\sec^{-1}$, and more preferably 1,000 to 5,000 $\sec^{-1}$.

In addition to the aforementioned components, various additives that are commonly blended in a rubber composition, for example, other reinforcing agent (filler) such as carbon black or silica, a vulcanizing or cross-linking agent, a vulcanizing or cross-linking promoter, a plasticizer, various oils and an anti-oxidant may be blended in the thermoplastic elastomer composition of the present invention. The amount of these additives may be a conventionally ordinary amount, as long as it serves the object of the present invention.

The thermoplastic elastomer composition of the present invention can be made into a film by an extruder equipped with a T-die, inflation molding machine or the like.

The pneumatic tire of the present invention is a pneumatic tire in which a film comprising the aforementioned thermoplastic elastomer composition is used as inner liner. As the method of producing the tire, a commonly used method can be employed. For example, the thermoplastic elastomer composition of the present invention is extruded into the form of a film having a prescribed width and thickness, which is then laminated cylindrically onto a tire forming drum. Thereonto, members commonly used in the production of a tire such as a carcass layer, belt layer and tread layer, which comprise non-vulcanized rubber, are sequentially laminated, and the drum is removed to obtain a green tire. Thereafter, by thermally vulcanizing this green tire in accordance with a conventional method, a desired pneumatic tire can be produced.

The thermoplastic elastomer composition of the present invention can also be used in the production of a hose. As the method of producing a hose using the thermoplastic elastomer composition of the present invention, a commonly used method can be employed. For example, a hose can be produced as in the following. First, using a pellet of the thermoplastic elastomer composition of the present invention, the thermoplastic elastomer composition is extruded on a mandrel, onto which a releaser has been applied in advance, by a cross-head extrusion method using a resin extruder to form an inner pipe. Another thermoplastic elastomer composition of the present invention or a common thermoplastic rubber composition may be further extruded onto the inner pipe to form an outer layer of the inner pipe. Next, as necessary, an adhesive is provided by application, spraying or the like onto the inner pipe. Further, using a braider, reinforcing yarns or reinforcing steel wires are braided on the inner pipe. After applying, as necessary, an adhesive to adhere the inner pipe with an outer pipe onto the thus formed reinforcing layer, the thermoplastic elastomer composition of the present invention or other common thermoplastic rubber composition is extruded by a cross-head resin extruder in the same manner to form the outer pipe. Finally, by removing the mandrel, a hose can be obtained. Examples of the adhesive applied onto the inner pipe or reinforcing layer include those of isocyanate-based, urethane-based, phenol resin-based, resorcin-based, chlorinated rubber-based and HRH-based, and particularly preferable are an isocyanate-based adhesive and urethane-based adhesive.

EXAMPLES (1) Raw Materials

As the ethylene-vinyl alcohol copolymer (A), SOANOL® A4415 (ethylene unit content: 44 mol %) manufactured by Nippon Synthetic Chemical Industry Co., Ltd. was used. Hereinafter, it is referred to as "EVOH".

As the modified rubber (B), maleic anhydride-modified ethylene-propylene copolymer (TAFMER® MP0620 manufactured by Mitsui Chemicals, Inc.; hereinafter referred to as "Mah-EP") was used.

As the compound (C) having at least two amino groups, 2,2'-diaminodiphenyl disulfide (D1246 manufactured by Tokyo Chemical Industry Co., Ltd.) and 3,3'-diaminodiphenyl sulfone (3,3'-DAS manufactured by Mitsui Fine Chemical, Inc.) were used.

As a cross-linking agent which does not correspond to the compound (C) having at least two amino groups, o,o'-dibenzamidodiphenyl disulfide (NOCTIZER SS manufactured by Ouchi Shinko Chemical Industrial Co., Ltd.) was used.

(2) Preparation of Thermoplastic Elastomer Compositions

The ethylene-vinyl alcohol copolymer and maleic anhydride-modified ethylene-propylene copolymer were fed to a biaxial kneader at a blending ratio shown in Table 1 and melt-blended at a kneader temperature of 230° C. Once the maleic anhydride-modified ethylene-propylene copolymer is dispersed, 2,2'-diaminodiphenyl disulfide, and/or 3,3'-diaminodiphenyl sulfone, or o,o'-dibenzamidodiphenyl disulfide were fed at an amount shown in Table 1 and melt-blended. Subsequently, the thus melt-blended mixtures were continuously extruded from the extruder in the form of a strand, which were cooled with water and cut by a cutter to obtain thermoplastic elastomer compositions in the form of a pellet.

(3) Method of Evaluating the Thermoplastic Elastomer Compositions

For the obtained thermoplastic elastomer compositions, the melt viscosity, extrusion load and low-temperature durability were evaluated by the following method.

[Melt Viscosity]

Melt viscosity refers to the melt viscosity of the component at an arbitrary temperature during kneading processing. The melt viscosity of each polymer material has a dependency on the temperature, shear rate and shear stress; therefore, the stress and shear rate of the polymer material are measured normally at an arbitrary temperature at which the polymer material is in a melted condition to flow in a capillary, particularly at the temperature range during kneading, to determine the melt viscosity by the following equation:

$$\eta = \text{shear stress/shear rate}$$

In the present invention, a capillary rheometer, Capilograph 1C manufactured by Toyo Seiki Seisaku-sho, Ltd., was used to measure the melt viscosity (Pa·s) of the thermoplastic elastomer compositions at 250° C. and a shear rate of 250 sec$^{-1}$. From the standpoint of film moldability, the melt viscosity is preferably not higher than 1,800 Pa·s.

[Extrusion Load]

When the thermoplastic elastomer compositions in the form of a pellet were extruded using a 40 mmφ extruder equipped with a 200 mm wide T-die, manufactured by Pla Giken Co., Ltd., under a constant temperature of 20° C. higher than the melting point of the thermoplastic elastomer, the extrusion load was measured by a resin pressure sensor at the tip of the extruder. The values are indicated in terms of an index with the resin pressure of Comparative Example 1 being 100. The smaller the index, the smaller and superior the extrusion load.

[Low-Temperature Durability]

Using a 40 mmφ extruder equipped with a 200 mm wide T-die manufactured by Pla Giken Co., Ltd., the thermoplastic elastomer compositions in the form of a pellet were extruded under a constant condition in which the temperature was set at 20° C. higher than the melting point of the thermoplastic elastomer and molded into sheets having an average thickness of 1 mm. Next, the thus obtained sheets were cut by JIS #3 dumbbell and subjected to 40% repeated deformation at −35° C. The measurement of breakings was carried out five times to calculate an average value of the number of breakings, which was designated as the average number of breakings. The average numbers of breakings of the Examples are indicated in terms of an index with that of Comparative Example 1 being 100. The larger the index, the superior the low-temperature durability.

(4) Results of the Evaluation of the Thermoplastic Elastomer Compositions

The evaluation results are shown in Tables 1 and 2.

TABLE 1

|  |  | Comparative Example 1 | Example 1 | Example 2 | Example 3 | Example 4 | Example 5 | Example 6 |
|---|---|---|---|---|---|---|---|---|
| Ethylene-vinyl alcohol copolymer | [parts by weight] | 80.0 | 80 | 80 | 80 | 80 | 80 | 80 |
| Maleic anhydride-modified ethylene-propylene copolymer | [parts by weight] | 100.0 | 105 | 110 | 120 | 95 | 90 | 80 |
| 2,2'-diaminodiphenyl disulfide | [parts by weight] | — | 0.5 | 1.0 | 2.0 | — | — | — |
| 3,3'-diaminodiphenyl sulfone | [parts by weight] | — | — | — | — | 0.5 | 1.0 | 2.0 |
| o,o'-dibenzamidodiphenyl disulfide | [parts by weight] | — | — | — | — | — | — | — |
| Total | [parts by weight] | 180.0 | 185.5 | 191 | 202 | 175.5 | 171 | 162 |
| Amount of Mah-EP based on 100 parts by weight of EVOH | [parts by weight] | 125 | 131.25 | 137.5 | 150 | 118.75 | 112.5 | 100 |
| Amount of compound (C) based on 100 parts by weight of Mah-EP | [parts by weight] | 0 | 0.48 | 0.91 | 1.67 | 0.53 | 1.11 | 2.5 |
| Melt viscosity | (Comparative Example 1 = 100) | 100 | 95 | 90 | 85 | 100 | 100 | 100 |
| Extrusion load | (Comparative Example 1 = 100) | 100 | 95 | 90 | 85 | 100 | 100 | 100 |
| Low-temperature durability | (Comparative Example 1 = 100) | 100 | 100 | 100 | 100 | 180 | 210 | 270 |

TABLE 2

|  |  | Example 7 | Example 8 | Example 9 | Comparative Example 2 | Comparative Example 3 |
|---|---|---|---|---|---|---|
| Ethylene-vinyl alcohol copolymer | [parts by weight] | 80 | 80 | 80 | 80 | 80 |
| Maleic anhydride-modified ethylene-propylene copolymer | [parts by weight] | 100 | 100 | 100 | 100 | 100 |
| 2,2'-diaminodiphenyl disulfide | [parts by weight] | 0.25 | 0.50 | 1.00 | — | — |
| 3,3'-diaminodiphenyl sulfone | [parts by weight] | 0.35 | 0.70 | 1.40 | — | — |
| o,o'-dibenzamidodiphenyl disulfide | [parts by weight] | — | — | — | 0.50 | 1.0 |
| Total | [parts by weight] | 180.6 | 181.2 | 182.4 | 180.5 | 181.0 |
| Amount of Mah-EP based on 100 parts by weight of EVOH | [parts by weight] | 125 | 125 | 125 | 125 | 125 |
| Amount of compound (C) based on 100 parts by weight of Mah-EP | [parts by weight] | 0.35 | 0.7 | 1.40 | 0 | 0 |
| Melt viscosity | (Comparative Example 1 = 100) | 95 | 90 | 80 | 100 | 100 |
| Extrusion load | (Comparative Example 1 = 100) | 95 | 90 | 80 | 100 | 100 |
| Low-temperature durability | (Comparative Example 1 = 100) | 180 | 210 | 270 | 100 | 100 |

In Comparative Example 1, the modified rubber (B) was not dynamically cross-linked.

In Examples 1 to 3, the modified rubber (B) was dynamically cross-linked by the compound (C1) having at least two amino groups and at least one disulfide bond. It can be seen that, compared to Comparative Example 1, the low-temperature durability was maintained while reducing the extrusion load and capillary viscosity.

In Examples 4 to 6, the modified rubber (B) was dynamically cross-linked by the compound (C2) having at least two amino groups and having no disulfide bond. It can be seen that, compared to Comparative Example 1, the low-temperature durability was improved while reducing the extrusion load and capillary viscosity.

In Examples 7 to 9, the modified rubber (B) was dynamically cross-linked by the compound (C1) having at least two amino groups and at least one disulfide bond, as well as by the compound (C2) having at least two amino groups and having no disulfide bond. It can be seen that, compared to Comparative Example 1, the low-temperature durability could be improved while reducing the extrusion load and capillary viscosity.

In Comparative Examples 2 and 3, the modified rubber (B) was dynamically cross-linked by the cross-linking agent which does not correspond to the compound (C) having at least two amino groups. In this case, it can be seen that there was no major change in the extrusion load and capillary viscosity, as well as the low-temperature durability.

INDUSTRIAL APPLICABILITY

The thermoplastic elastomer composition of the present invention can be used in the production of a tire, particularly a pneumatic tire. Especially, the thermoplastic elastomer composition of the present invention can be suitably used in the production of an inner liner of a pneumatic tire. In addition, the thermoplastic elastomer composition of the present invention can be used in applications in which gas-barrier properties are demanded, such as a hose.

The invention claimed is:

1. A thermoplastic elastomer composition comprising an ethylene-vinyl alcohol copolymer (A) and a modified rubber (B) dispersed in the ethylene-vinyl alcohol copolymer (A), wherein the modified rubber (B) is an acid anhydride-modified ethylene-α-olefin copolymer, an acid anhydride-modified ethylene-unsaturated carboxylic acid copolymer or an acid anhydride-modified copolymer of ethylene and an alkyl ester of an unsaturated carboxylic acid and is dynamically cross-linked by a compound (C1) having at least two amino groups and at least one disulfide bond or diaminodiphenyl sulfone.

2. A thermoplastic elastomer composition according to claim 1, wherein the compound (C1) has a disulfide bond.

3. A thermoplastic elastomer composition according to claim 1, comprising 90 to 180 parts by weight of the modified rubber (B) based on 100 parts by weight of the ethylene-vinyl alcohol copolymer (A).

4. A thermoplastic elastomer composition according to claim 1, comprising 0.01 to 5 parts by weight of the compound (C1) having at least two amino groups based on 100 parts by weight of the modified rubber (B).

5. A pneumatic tire comprising a film composed of a thermoplastic elastomer composition according to claim 1 as an inner liner.

6. A thermoplastic elastomer composition comprising an ethylene-vinyl alcohol copolymer (A) and a modified rubber (B) dispersed in the ethylene-vinyl alcohol copolymer (A), wherein the modified rubber (B) has an acid anhydride group and is dynamically cross-linked by a compound (C1) having at least two amino groups and at least one disulfide bond and a compound (C2) having at least two amino groups and having no disulfide bond.

7. A thermoplastic elastomer composition according to claim 6, wherein the modified rubber (B) is an acid anhydride-modified ethylene-α-olefin copolymer, an acid anhydride-modified ethylene-unsaturated carboxylic acid copolymer or an acid anhydride-modified copolymer of ethylene and an alkyl ester of an unsaturated carboxylic acid.

8. A thermoplastic elastomer composition according to claim 6, comprising 90 to 180 parts by weight of the modified rubber (B) based on 100 parts by weight of the ethylene-vinyl alcohol copolymer (A).

9. A thermoplastic elastomer composition according to claim 6, comprising 0.01 to 5 parts by weight of the compound (C1) having at least two amino groups based on 100 parts by weight of the modified rubber (B).

10. A pneumatic tire comprising a film composed of a thermoplastic elastomer composition according to claim 6 as an inner liner.

* * * * *